(12) United States Patent
Gordon et al.

(10) Patent No.: US 7,865,926 B2
(45) Date of Patent: Jan. 4, 2011

(54) SYSTEM FOR INTERACTIVELY DISTRIBUTING INFORMATION SERVICES

(75) Inventors: Donald Gordon, Pacific Grove, CA (US); Christopher Goode, Menlo Park, CA (US); Jack Van der Star, Oyama (CA); Stanley Knight, Cranbury, NJ (US); Danny Chin, Princeton Junction, NJ (US)

(73) Assignee: Comcast IP Holdings I, LLC, Philadelphia, PA (US)

( * ) Notice: Subject to any disclaimer, the term of this patent is extended or adjusted under 35 U.S.C. 154(b) by 0 days.

(21) Appl. No.: 12/637,375

(22) Filed: Dec. 14, 2009

(65) Prior Publication Data

US 2010/0095322 A1   Apr. 15, 2010

Related U.S. Application Data

(62) Division of application No. 09/739,182, filed on Dec. 18, 2000, now Pat. No. 7,657,918, which is a division of application No. 08/984,710, filed on Dec. 3, 1997, now Pat. No. 6,253,375.

(60) Provisional application No. 60/034,489, filed on Jan. 13, 1997.

(51) Int. Cl.
*H04N 7/16* (2006.01)
*H04N 7/167* (2006.01)
*H04N 7/173* (2006.01)

(52) U.S. Cl. .............................. 725/93; 725/25; 725/28; 725/30; 725/31; 725/86; 725/87; 725/105

(58) Field of Classification Search ............. 725/25–30, 725/86, 87, 31, 93, 105
See application file for complete search history.

(56) References Cited

U.S. PATENT DOCUMENTS

| 4,430,731 A | 2/1984 | Gimple et al. |
| 4,509,073 A | 4/1985 | Baran et al. |
| 4,573,072 A | 2/1986 | Freeman |
| 4,602,279 A | 7/1986 | Freeman |
| 4,623,920 A | 11/1986 | Dufresne et al. |

(Continued)

FOREIGN PATENT DOCUMENTS

EP   0183871   11/1986

(Continued)

OTHER PUBLICATIONS

Notice of Reasons for Rejection in JP2007-014121 dated Mar. 11, 2010.

(Continued)

*Primary Examiner*—Dominic D Saltarelli
(74) *Attorney, Agent, or Firm*—Banner & Witcoff, Ltd

(57) ABSTRACT

An interactive information distribution system includes service provider equipment for generating an information stream that is coupled to an information channel and transmitted to subscriber equipment. The service provider also generates a command signal that is coupled to a command channel and transmitted to the subscriber equipment. The service provider also receives information manipulation requests from the subscriber via a back channel. A communication network supporting the information channel, command channel and back channel is coupled between the service provider equipment and the subscriber equipment.

20 Claims, 5 Drawing Sheets

U.S. PATENT DOCUMENTS

| | | |
|---|---|---|
| 4,763,317 A | 8/1988 | Lehman et al. |
| 4,769,833 A | 9/1988 | Farleigh et al. |
| 4,792,849 A | 12/1988 | McCalley et al. |
| 5,014,125 A | 5/1991 | Pocock et al. |
| 5,070,400 A | 12/1991 | Lieberman |
| 5,165,091 A | 11/1992 | Lape et al. |
| 5,172,413 A | 12/1992 | Bradley et al. |
| 5,181,106 A | 1/1993 | Sutherland |
| 5,182,640 A | 1/1993 | Takano |
| 5,235,619 A | 8/1993 | Beyers, II et al. |
| 5,247,347 A | 9/1993 | Litteral et al. |
| 5,303,229 A | 4/1994 | Withers et al. |
| 5,357,276 A | 10/1994 | Banker et al. |
| 5,359,601 A | 10/1994 | Wasilewski et al. |
| 5,400,402 A | 3/1995 | Garfinkle |
| 5,410,343 A | 4/1995 | Coddington et al. |
| 5,414,455 A | 5/1995 | Hooper et al. |
| 5,459,506 A | 10/1995 | Bushnell |
| 5,461,415 A | 10/1995 | Wolf et al. |
| 5,481,542 A | 1/1996 | Logston et al. |
| 5,485,197 A | 1/1996 | Hoarty |
| 5,530,557 A | 6/1996 | Asit et al. |
| 5,530,754 A | 6/1996 | Garfinkle |
| 5,534,913 A | 7/1996 | Majeti et al. |
| 5,539,449 A | 7/1996 | Blahut et al. |
| 5,539,880 A | 7/1996 | Lakhani |
| 5,550,576 A | 8/1996 | Klosterman |
| 5,559,549 A | 9/1996 | Hendricks |
| 5,559,999 A | 9/1996 | Maturi et al. |
| 5,581,479 A | 12/1996 | McLaughlin et al. |
| 5,583,560 A | 12/1996 | Florin et al. |
| 5,586,264 A | 12/1996 | Belknap et al. |
| 5,600,364 A | 2/1997 | Hendricks et al. |
| 5,657,072 A | 8/1997 | Aristides et al. |
| 5,671,217 A | 9/1997 | Adams et al. |
| 5,675,732 A | 10/1997 | Majeti et al. |
| 5,768,539 A | 6/1998 | Metz et al. |
| 5,832,483 A | 11/1998 | Barker |
| 5,905,522 A | 5/1999 | Lawler |
| 5,987,518 A | 11/1999 | Gotwald |
| 6,163,272 A * | 12/2000 | Goode et al. .................. 725/30 |

FOREIGN PATENT DOCUMENTS

| | | |
|---|---|---|
| EP | 594351 | 4/1994 |
| EP | 0730383 | 9/1996 |
| GB | 2118750 | 11/1983 |
| JP | 07212353 | 8/1995 |
| JP | 07248980 | 9/1995 |
| JP | 08154233 | 6/1996 |
| JP | 09009242 | 1/1997 |
| JP | 09505186 | 5/1997 |
| JP | 2001527708 | 12/2001 |
| WO | 9414281 | 6/1994 |
| WO | 9513681 | 5/1995 |
| WO | 9515658 | 6/1995 |
| WO | 9608927 | 3/1996 |
| WO | 9617476 | 6/1996 |
| WO | 9637075 | 11/1996 |

OTHER PUBLICATIONS

Supplementary EP Search Report in EP 97953131 dated Sep. 14, 2007.

Guha, et al., "Multichannel Joint Rate Control of VBR MPEG Encoded Video for DBS Applications", Aug. 1994, IEEE Transactions on Consumer Electronics, vol. 40, Issue 3, pp. 616-621.

Examiner's Report in CA 2,574,079 dated Apr. 14, 2009.

Little, et al., "Prospects of Interactive Video-on-Demand", IEEE Multimedia, vol. 1, Issue 3 (1994), pp. 14-24.

Opponent's Statement of Case in the matter of *I.C.I. Telecom Ltd.* vs. *DIVA Systems Corporation* signed Jun. 14, 2004, 13 pages.

International Preliminary Examination Report for PCT/US97/22631 dated Sep. 7, 1999.

Official Communication for EP 97 953 131.6-2413 dated Jan. 10, 2008.

Notice of Reasons for Rejection for PH10-530868 dated Oct. 24, 2006.

* cited by examiner

SYSTEM FOR INTERACTIVELY DISTRIBUTING INFORMATION SERVICES

This application is a divisional of copending U.S. patent application Ser. No. 09/739,182 filed Dec. 18, 2000, which is a divisional of U.S. patent application Ser. No. 08/984,710, filed Dec. 3, 1997 (now U.S. Pat. No. 6,253,375, issued Jun. 26, 2001), which claims priority to U.S. Provisional App. No. 60/034,489 filed Jan. 13, 1997. These applications are incorporated herein by reference in their entireties.

BACKGROUND OF THE INVENTION

1. Field of the Invention

The present invention relates to a system for delivering interactive information services, such as video, audio, library, interactive games, and the like to one or more subscribers. More particularly, the invention relates to a system for establishing a multi-channel communicative connection between a subscriber's set top terminal and a service provider and then managing the communications necessary to deliver interactive information services to the subscriber(s).

2. Description of the Background Art

Recent advances in digital signal processing techniques and, in particular, advancements in digital compression techniques, have led to a plethora of proposals for providing new digital services to a subscriber's home via existing telephone and coaxial cable networks. For example, it has been proposed to provide hundreds of cable television channels to subscribers by compressing digital video, transmitting the compressed digital video over conventional coaxial cable television cables, and then decompressing the video at the subscriber's set top terminal. Another proposed application of this technology is a movie-on-demand video system in which a subscriber communicates directly with a video service provider via telephone lines to request a particular video program from a video library and the requested video program is routed to the subscriber's home via telephone lines or via the coaxial television cables for immediate viewing.

However, these present movie-on-demand video systems are not truly interactive systems wherein a subscriber can selectively access a large audio, video or data library and control the presentation of the selected information on a real-time basis, as when a video program is played using a video cassette recorder (VCR). Most of the presently available systems have a simple control interface that permits subscribers to merely order information without any further control of the presentation of the information. Other, more sophisticated systems, have a control interface that contains more complex commands such as start, stop, pause, fast-forward and rewind to permit rudimentary control of the presentation of the information. However, these systems use conventional signaling and information routing networks that are relatively slow to react to the commands, e.g., the latency between the instant an interactive function is requested and when that function takes effect is extremely long. Furthermore, the set top terminals used by these systems contain complex and costly electronics to facilitate processing of the complex commands. Additionally, these systems use a conventional cable television network architecture, where a central data server transmits data to a plurality of head end subsystems which in turn propagate various subsets of the data to an individual or a multiplicity of set top terminals. The servers in such systems perform much of the control functions and, as such, the latency arising from sending control commands through the head end to the server is substantial.

Therefore, there is a need in the art for a cost effective, interactive information distribution system that provides real-time interaction (with relatively short latency) between the subscriber and the service provider at any time during the presentation of requested information.

SUMMARY OF THE INVENTION

The disadvantages heretofore associated with the prior art are overcome by the present invention. The present invention is a system for interactively distributing information services. The system contains an information server, a video session manager, a bi-directional cable transport network, and subscriber equipment (e.g., a set top terminal, an input device, and a display device).

The system uses three independent communications channels to facilitate distribution and interactive control of the information distribution process. Specifically, an information channel propagates program information and a command channel propagates control information from the service provide to the subscriber equipment, and a back channel propagates command and control information from the subscriber equipment to the service provider. The information channel may also be utilized to transport control information to the subscriber equipment. Consequently, the service provider sends through the command and/or information channels selection menus to the subscriber equipment such that a subscriber can select a particular program. The program selection request is propagated through the back channel to the service provider. The service provider then sends the program through the information channel for display on the subscriber equipment. The subscriber can manipulate (e.g., fast-forward, pause, rewind, perform context based branching and the like) the presentation via commands sent from the subscriber equipment to the service provider.

More specifically, the server provides a video session manager with a plurality of program streams that generally comply with the MPEG-2 transport protocol. The program streams are generated using a common, high accuracy clock signal (synchronization clock) such that the data in the plurality of streams is synchronous. The video session manager interacts with the server to request particular information program streams in response to subscriber demands. Once a subscriber requests use of the service provider navigator to facilitate selection of viewable programming, the video session manager opens a "session" for a given subscriber and sends requested program streams through the cable transport network to the subscriber's set top terminal via the information channel.

To provide real-time interactive control of the information presentation to the subscriber, the subscriber, through their input device (remote control), may order, start, stop, fast-forward, rewind, pause and branch from or to any information stream that is resident on the server subsystem. As such, the system of the present invention provides the customer with all of the interactive commands that are generally available on a conventional video cassette recorder. Additionally, the user can open multiple sessions such that multiple information streams may be started and stopped and interactively controlled at any time. Such interaction is facilitated by the system because the system is synchronized from end-to-end. That is, the server provides the synchronization clock to which all subsystems of the invention are synchronized. The system synchronization extends to the cable transport network and the subscriber's set top terminal.

In particular, the synchronization clock is used by the video session manager to modulate all of the data streams such that each transmitted stream is synchronized with other streams. Furthermore, the set top terminals recover timing from the synchronized data bits within the received stream; thus, the set top terminals are also synchronized to the synchronization clock. As such, when a subscriber changes from one program to another, there is no resynchronization delay before the different program is available for display. Consequently, the latency between when a command is entered and when it is implemented is relatively short. Thus, a subscriber can have multiple sessions open and switch from one to another without substantial delay after each session change.

To reduce the cost associated with transmission and presentation of each program stream, the system of the present invention avoids encrypting all of the information that is sent to the set top terminals. System security, without encryption, is provided by randomly assigned and altered program identification numbers (PID). Specifically, when a session is started by a subscriber request, the set top terminal is assigned a unique session number. Additionally, the set top terminal has an assigned identification number (TID). This TID is compared to a TID stored in the system such that the user identification is confirmed. Periodically, the TID numbers are automatically updated on a random basis to insure system security.

The requested information is multiplexed onto an information channel, e.g., ten streams of 2.6 Mbit/sec data are carried by a single information channel to a plurality of set top terminals (a neighborhood). A neighborhood may be serviced by more than one channel to further increase the transmission flexibility. For instance, the terminals are dynamically allocated to the channels such that 10 terminals can simultaneously share one channel or three terminals can receive 5.2 Mbit/sec data, and so on. Consequently, any combination of data rates is permissible and the data rate for a particular subscriber depends upon the requested information. Some programs, such as basketball games, may require a large transmission bandwidth to avoid compression anomalies. The present invention provides dynamic data rate flexibility to provide subscribers with the best signal quality possible.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is a cost effective, interactive information distribution system that provides an individual or a plurality of subscribers with information such as multimedia programming, audio, video, graphics, and the like. This information is available in an "on demand" basis. Furthermore, the system enables subscribers to control, in real-time, the presentation of the information, e.g., requested stream can be started, stopped, paused, reversed, fast forwarded and branched without substantial latency. The information can be supplied to the subscribers through broadcast, where all subscribers receive the same information; pointcast, where each subscriber receives specific information that is only addressed to a specific subscriber; or narrowcast, where a subset of all the subscribers received particular information.

The system as a whole is discussed below in summary fashion. Thereafter, each inventive component subsystem of the inventive system is individually discussed in detail.

A. System Overview

Figure 1:
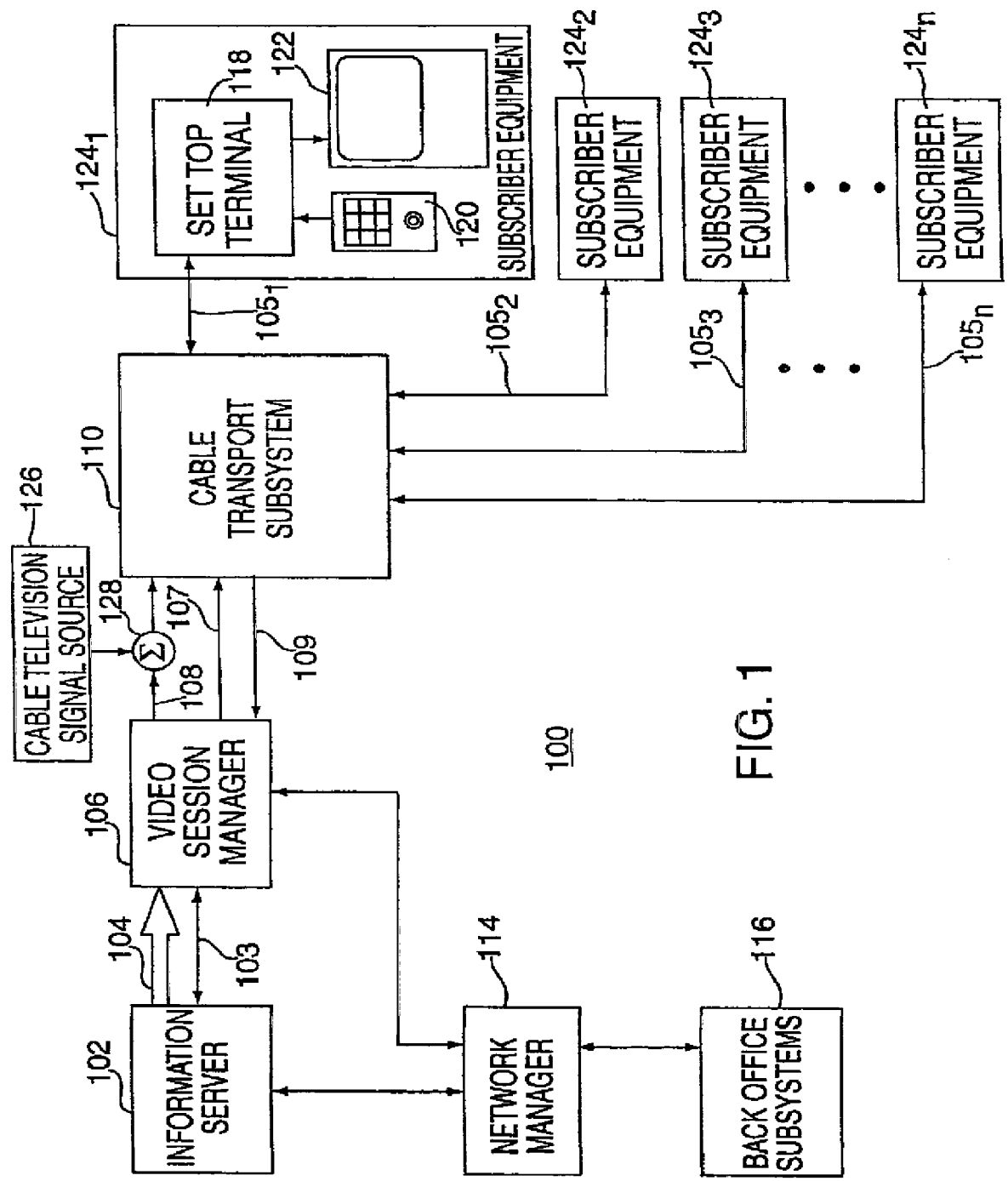
FIG. 1 depicts a high-level block diagram of an interactive information distribution system in accordance with the present invention.

FIG. 1 is high-level block diagram of the interactive information distribution system 100 of the present invention. The system contains an information server 102, at least one video session manager 106, a network manager 114, back office subsystems 116, a cable transport network 110, and a plurality of subscriber equipment 124. The subscriber equipment 124 includes a set top terminal 118, an input device (e.g., a remote control 120) and a display device 122.

The information server 102 provides a plurality of packetized data streams, via path 104, and a synchronization clock signal, via path 103, to one or more video session managers 106 (only one of which is shown). Alternatively, the plurality of data streams is multiplexed onto an optical fiber (a trunk) and each video session manager is connected to the trunk by a "drop line." The number of video session managers is proportional to the number of subscribers being serviced by the system, e.g., each video session manager can generally service up to 2000 subscribers. The server 102 provides information (data streams) in response to specific information requests from the video session manager that are communicated to the server through a communications network. The video session manager performs various system command and control functions as well as communicates the data streams to the cable network. As such, the system uses three directional communication channels to perform control and communication operations. The video session manager may address the streams to be propagated to the subscribers in broadcast, narrowcast, or pointcast modes.

Specifically, the video session manager modulates each of the baseband data streams onto a carrier signal and upconverts the signal to a transmission frequency that complies with conventional cable television (CATV) frequency spectrum. Illustratively, the downstream data modulation is, for example, 64-ary quadrature amplitude modulation (QAM) and the transmission frequency is in the range 50 to 750 MHz. Other modulation types and frequency bands may be used. This information is coupled to the cable network via path 108 and is carried through the cable network on what is referred to as the information channel.

The video session manager 106 also transmits control information through a downstream command channel (path 107) contained within the cable transport network 110 to the subscriber equipment 124. This command and control information is transmitted on a carrier in the range 50 to 750 MHz using a 1 MHz bandwidth, e.g., the command information is frequency multiplexed with the information channel and transmitted through the network 110. Furthermore, the subscriber equipment 124 communicates via a reverse (or back) channel to the video session manager 106 through the cable transport network 110 and the reverse channel path 109. There are typically 16 such reverse channels supported by each video session manager. Each reverse channel carries, for example, a BPSK modulated signal on a carrier in the range 5-42 MHz, where the channel capacity is approximately 64 kbps. Other frequency ranges, modulation types or channel capacities may be used.

In addition to the information that can be interactively manipulated, the system provides for communication of conventional cable television signals (analog signals) to the subscriber equipment. Specifically, a conventional cable signal source 126 (e.g., a conventional cable head end) is coupled to one input of a signal summer 128. The other input of summer 128 is coupled to path 108 from the video session manager 106. As such, the conventional cable signals propagate to the subscriber equipment to supplement the interactive information provided by the service provider.

The cable transport network 110 is typically, but not exclusively, a conventional bi-directional hybrid fiber-coax cable network. Depending upon the fiber node size, the invention requires between two and five available conventional cable channels (e.g., 6 MHz bandwidth channels) to effectively provide service to approximately 2000 subscribers. In addition to the downstream information channels, the network must also support the downstream command channel and the upstream "back" channel.

The subscriber equipment 124 is coupled to the cable transport network 110 by path 105 (e.g., coaxial cable) and contains a set top terminal 118, an input device 120, and a display device 122. The set top terminals 118 receive and demodulate the downstream signals including those propagated through both the command channel and the information channel. The set top terminals also optionally demodulate standard cable television signals received from the network. Thus, a single set top terminal can be used to receive all the cable services provided by the network. The set top terminals also provide interactive control of the information presentation. The presentation is controlled via the input device 120, e.g., an infrared (IR), radio frequency (RF), or some other remote control unit. The information, e.g., audio, video, still photographs, graphics, multimedia programs and the like are portrayed on the display device 122 such as a television, video monitor, stereo system and the like.

The network manager 114 manages the system assets, provides security measures, and ensures synchronization of all system components. The network manager communicates with all the system components via a communication bus architecture 112. This bus may be implemented using a conventional ETHERNET or a standard communications or, standard networking architecture. The network manager 114 also communicates with the back office subsystems 116 that maintain the subscriber account management software. This software performs billing and accounting functions to correlate the subscriber identification numbers with information resources that are requested and the price of that information resource. Such back office systems do not form any part of the present invention; therefore, this system component will not be discussed any further, but is mentioned here for completeness.

In operation, each set top terminal is assigned a unique identification code and each subscriber has a defined personal identification number (PIN). The PINs may be allocated by family or by family member, e.g., children can have different PINs than parents. PIN allocation and management is disclosed in commonly assigned U.S. patent application Ser. No. 08/738,343 filed Oct. 25, 1996 and incorporated herein by reference.

To the subscriber, the default system signal exists from the set top terminal for processing by an output device such as a television or other equipment depending on the nature of the output signal. On the subscriber's television it may appear as predetermined one channel in the plurality of cable channels available to the customer. The default signal may be presented as a "barker channel" which invites a viewer to subscribe to or access the service or, at least, browse through a number of available information offerings. The default system signal, if in the form of a barker channel or other cable channel is continuously broadcast to all subscribers and potential subscribers. The barker channel maybe analog, digital, or both as set to the set top terminal.

If interested, the viewer selects entry into the system by manipulating the buttons (or joystick) of the remote control 120. During the selection process, the viewer (now a potential subscriber) is presented with an on-screen browser (a graphical interface generally known as a navigator) that aids the viewer in finding information, the prices of the selections, search aides, and the like. The commands used to navigate throughout the various menus are transmitted from the set top terminal to the video session manager via the back channel. The video session manager responds to customer commands via the downstream command and information channels. When the subscriber executes the navigator, the video session manager opens a session for that particular subscriber.

Once a program, for example, a movie, is selected for viewing, the video session manager 106 associates the selected program with the open session for that particular subscriber. The subscriber PIN is requested and checked against a PIN database managed by the network manager 114. Also, the set top terminal ID (TID) is checked against a database of terminal IDs to ensure that the request is being made from an authorized terminal. Each program that is available has a set of unique identification numbers or PIDs. Thus, when a program is requested, the video session manager 106 sends the PID to the server 102 along path 103. As such, the server recalls the program from memory and provides the requested information to the video session manager as a packetized data stream. The data stream packets are addressed to the appropriate TID and carry the PID for the requested program. The video session manager processes the data streams for transmission onto the cable network and the set top terminal retrieves all the packets addressed to its TID. The set top terminal decodes and decompresses the data for presentation to the subscriber.

At any time during the presentation of the requested information, the subscriber may request special functions be performed. For example, the subscriber can begin another session, temporarily stopping the previous session. Additionally, the customer may stop, pause, rewind, or fast forward the information. The subscriber may leave the system and return later to watch the program from the location where the subscriber interrupted the program. Each of these functions is accomplished by manipulating the remote control. The set top terminal sends the control information via the back channel to the video session manager. The video session manager informs the server of the control command for implementation as well as informs the network manager of the command so that billing can be appropriately altered. In this manner, a subscriber is provided a real-time, fully functional information-on-demand system.

One important feature of the invention that allows for such system flexibility is end-to-end system synchronization. To facilitate end-to-end synchronization, the server uses a high accuracy (level 1) clock signal as a reference signal for all server timing. As such, all the data streams are synchronized to the reference signal (synchronization clock signal). Additionally, the reference signal is supplied (path 103) along with the data streams to the video session manager. The video session manager uses a single oscillator source that is phase-locked to the reference signal to modulate all the data streams such that the streams remain synchronized. The streams carry timing data via synchronized data transitions to the set top terminals such that each set top terminal is synchronized to a stream then being received. Since all streams are synchronized with one another, the set-top terminals can seamlessly switch from one stream to another without incurring a timing error, i.e., resynchronization is not necessary.

The following discusses each of the component subsystem blocks of the system in detail.

B. The Server 102

The server 102 is typically a parallel processing computer system capable of accepting information requests from the video session manager 106, recalling that information from memory and generating a plurality of program streams containing the information. One such server is the SARNOFF SERVER computer system manufactured by Sarnoff Real Time Corporation of Princeton, N.J. SARNOFF SERVER is a trademark of Sarnoff Real Time Corporation. The SARNOFF SERVER computer system has an input bandwidth of 5.4 Gbps and, at maximum capacity, can serve up to 10.8 Gbps of program material. The program information may be stored within the computer system's disk drive array, an off-line storage system such as an optical disk library, and/or is available from a real-time program feed (digital or analog).

The server 102 provides a plurality of time division multiplexed data streams, e.g., thirty-two, containing the information requested by the video session managers to service requests for a plurality of subscribers. These signals may comply with the MPEG-2 standard for so-called, "elementary streams", "system streams" and "transport streams." These data streams are generally formatted into transport packets which comply with the MPEG-2 transport protocol or a similar transport protocol. The packetization and multiplexing process may be accomplished within the video session manager; however, the packetizing may be more efficiently handled by an output subsystem of the server or the data can be pre-packetized and stored in the data storage devices associated with the server. As such, the server provides requested information in a plurality of transport streams having the information requested by many subscribers packetized and multiplexed into thirty-two independent streams. Each packet carries a TID of a requesting set top terminal and is presented to the video session manager on a particular output port, e.g., one of the 32 ports. Additionally, the server provides the high accuracy clock signal (reference signal) on path 103.

Alternatively, the plurality of data streams are multiplexed onto an optical cable and a "multidrop" technique is used to distribute the streams to the various video session managers. Specifically, a plurality of "drop lines" connect the video session managers to the optical cable (a trunk) and the streams are addressed to the appropriate video session manager.

To facilitate timing synchronization, the packets used to propagate the program information to the set-top terminals have a fixed length (i.e., a fixed duration). In essence, the packetizing process converts the time division multiple access (TDMA) streams into packet division multiple access (PDMA) streams. Consequently, the packet duration defines a fundamental unit of time for the system. As such, the start or end of each packet provides an accurate timing signal that can be utilized by the set-top terminals for synchronization.

C. The Video Session Manager 106

Figure 2:
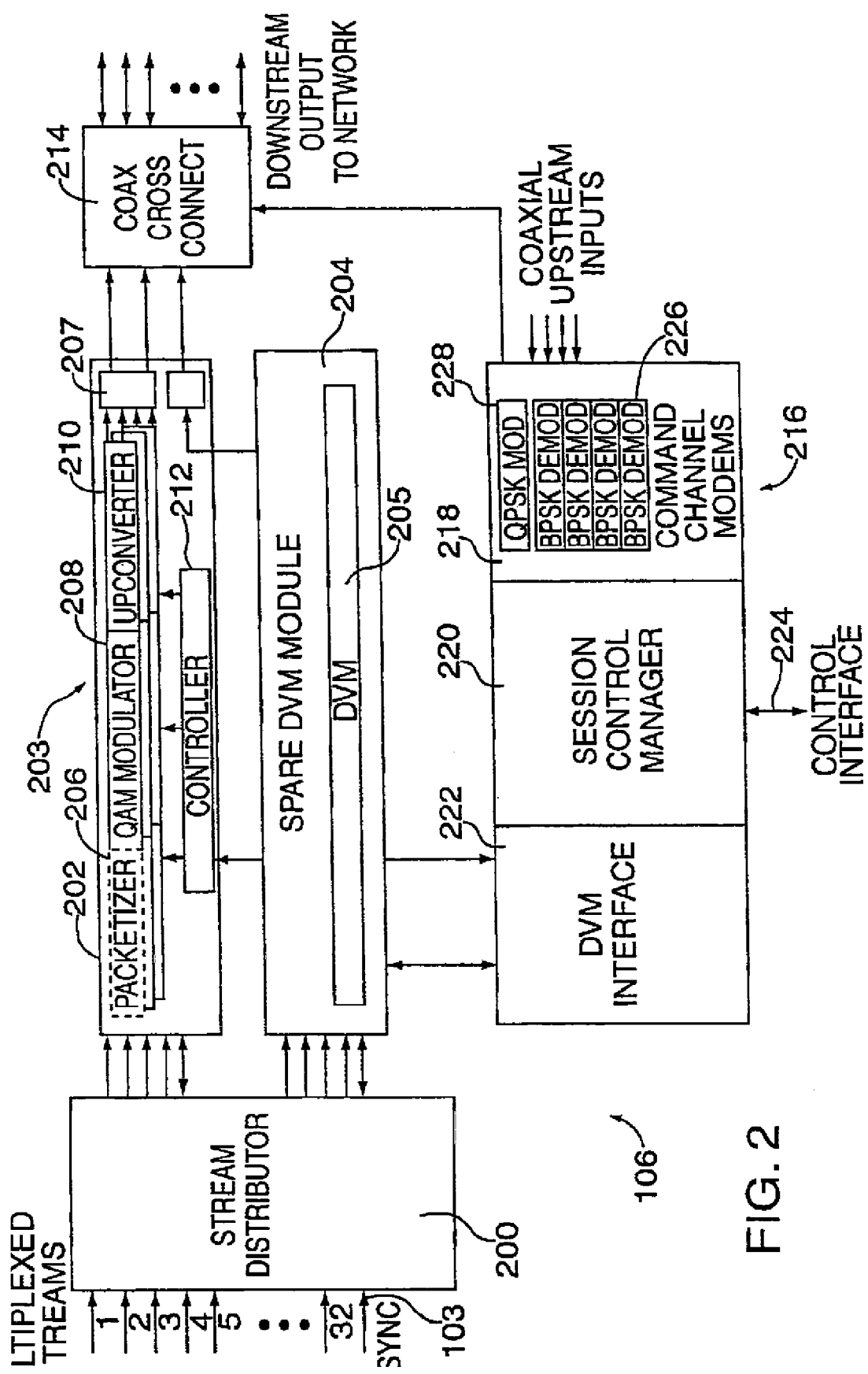
FIG. 2 depicts block diagram of a video session manager.

FIG. 2 depicts a block diagram of the video session manager 106. As mentioned above, the system generally uses multiple video session managers. Each manager provides information to up to 16 conventional cable transport network nodes ("neighborhood nodes") having up to 2000 subscribers each. Each video session manager distributes up to 320 different program streams to the nodes.

The video session manager 106 contains stream distributor 200, a digital video modulator (DVM) module 202 (also known as a DVM shelf) that contains a plurality of DVMs 203, a command and control module 216, and an output module (coax cross connect 214). The video session manager 106 also includes a spare DVM module 204 that contains a DVM 205 that can be substituted for any one of the DVMs 203 using a 1 for n sparing scheme. The stream distributor 200 mutes the plurality of data streams from the server to all DVMs 203. Each DVM has two output ports that service one or two neighborhoods. Furthermore, each of the output ports may carry either one or two information channels. In this manner, the DVM module generates four digitally modulated channels that are independently frequency agile. The output combiner 207 combines the 4 channels into two pairs of two channels.

As mentioned with respect to the server description, the circuit cards of the video session manager 106 may contain a packetizer 206 (shown in phantom) such that the server provides time division multiple access system streams and the DVM packetizes the information into transport packets complying with MPEG-2 or some other transport protocol, i.e., a packet division multiple access data stream. However, to efficiently process the information streams, the server generally provides packetized data before supplying the data streams to the stream distributor 200. As such, the packetizer is not necessarily a portion of the DVMs.

Further, each DVM contains four modulators 208 that modulate each transport stream into a 64-ary QAM signal with block interleaving and forward error correction. The upconverter 210 then upconverts the QAM signal to a particular frequency for transport on the cable network, e.g., a frequency in the range 200 to 750 MHz is commonly used. Frequency selection and the modulation process is controlled by a controller 212 operating under control of the DVM interface 222.

Each of the DVMs (generally there are eight DVMs) modulates four data streams. The output module 214, e.g., a coax cross connect unit, combines the downstream information channel with the downstream command information produced by the controller module 216.

The controller module 216 contains a DVM interface 222, a session control manager (SCM) 220, and at least one control channel modem 218. The control interface 224 has a conventional local area network architecture for communicating between the server and the video session manager. The DVM interface 222 has a conventional RS-482 serial bus architecture that interconnects controllers 212 for each DVM 203 and the session control manager 220. Other multipoint bus architectures, such as ETHERNET, may be substituted for the RS-482.

The control channel modems terminate the upstream and downstream control signals from/to the set top terminals. A single command and control modem can be used for each network node or a plurality of nodes, depending upon the communications traffic. Within each modem, the upstream demodulator is illustratively a binary phase shift key (BPSK) demodulator 226, while the downstream modulator is, for example, a quadrature phase shift key (QPSK) modulator 228. Of course, other modulation formats could be used. There are typically four upstream demodulators 230 for every downstream modulator 228.

The session control manager 220 is implemented using a commercially available microprocessor and operating system. The microprocessor must be fast enough to handle the control functions in real time.

In particular, the session control manager (SCM) 220 forms an interface to the set top terminals as well as the DVM modules 202 and 204 and the control interface (e.g., VME bus 112 in FIG. 1) 224. The SCM's responsibilities include set top terminal sign-on and time out, authentication, configuration, and control protocol termination; alarm management and frequency assignment; session security; service selection and control; event notification and usage metering; and a subscriber's access to account information. Commands and requests from the set top terminals are processed by the SCM and appropriate requests are made to the file server to perform certain information navigation and movie-on-demand functions.

Typically, there are nine DVMs (eight active modulators 202 and one spare 204) attached to and controlled by a single SCM. Physically, the DVM modules and the SCM are housed in a single rack. Each DVM module is assigned to the SCM by connecting its interface to an SCM's RS-482 controller (DVM interface 222) and entering the DVM RS-482 address in a configuration database of the RS-482 controller.

A DVM module configuration contains sixteen neighborhoods of set top terminals, each DVM services two neighborhoods using each of the DVM output ports. However, if one neighborhood is using the movie-on-demand service more than another, DVMs are removed from servicing one neighborhood and added to service the neighborhood with the higher demand, i.e., the DVMs are independently agile. The SCM simply keeps track of a number of "pools" of DVMs, the output of the DVMs in each pool being combined and broadcast. As long as the bandwidth is available on the upstream and downstream channels, DVMs may be dynamically moved from one pool to another.

The pools are additionally configured to allow only a subset of DVMs to be active simultaneously. The remaining DVMs are available as standbys and are automatically allocated when one of the active DVM's fails or is removed. Additionally, to increase subscriber service capacity, neighborhoods may run without a standby DVM module.

Figure 3:
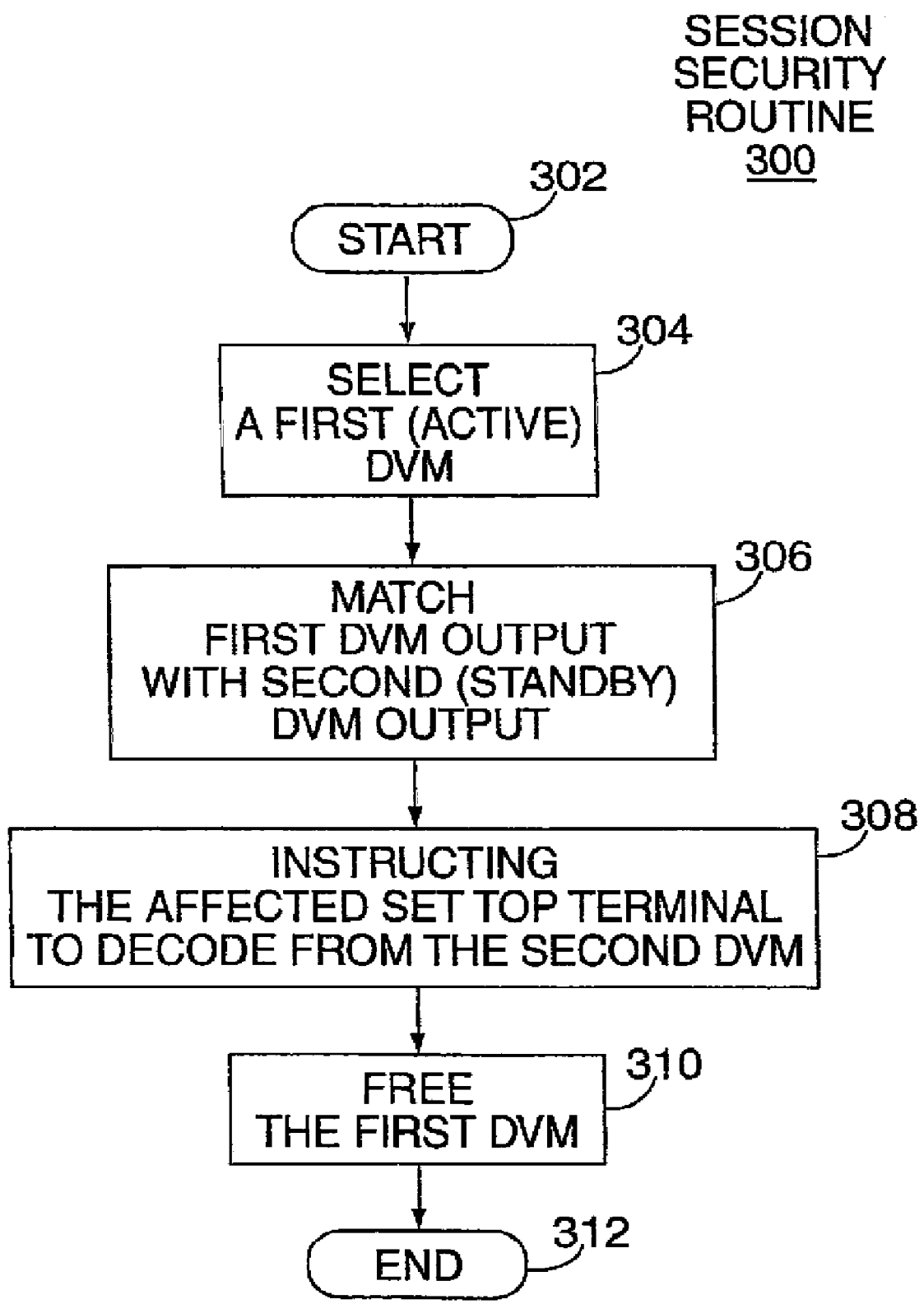
FIG. 3 depicts a flow diagram of a session security routine.

As one example of session security provided by the SCM, the SCM is capable of periodically changing the frequency of the DVM's output to make it more difficult for a non-subscriber to acquire free service. FIG. 3 depicts a flow diagram of this important feature of the invention. The session security routine 300 begins at step 302 and proceeds to step 304. The SCM selects, at step 304, an active DVM; matches, at step 306, its output on a standby DVM (but modulating at a different frequency); programs, at step 308, the affected set top terminal to decode from the new DVM location; and then frees, at step 310, the original DVM. The session security routine ends at step 312. This security measure requires the availability of a single free DVM frequency.

Returning to FIG. 2, a bus containing 32 transport streams (path 104) and a high accuracy clock signal (sync) (path 103) is provided from the file server. The synchronization clock is daisy chained through the DVMs within a rack. Each DVM is configured to extract one of the 32 transport streams for modulation. All of the data streams are synchronized to the synchronization clock signal. Furthermore, the DVM's all operate from a common frequency source that is phase-locked to the synchronization clock. As such, all DVM output streams are synchronized. DVM redundancy is performed by configuring the standby DVMs to extract the transport stream that was carried by a parallel active DVM and to modulate at the same frequency.

An SCM communicates with its set top terminals through a plurality of control channel modems (CCM) 218. A neighborhood is generally serviced by one or more CCM; however, broadly speaking a given CCM may service multiple neighborhoods and a plurality of neighborhoods may be serviced by a given CCM. The set top terminals which are connected to a given CCM must contend for the upstream channel that is available for propagating control signals from the set top terminals to the CCM and SCM.

The CCM modulates transmitted data blocks onto the downstream command channel and demodulates received data blocks from the upstream back channel. The upstream bandwidth is roughly 64 kilobytes per second, while the downstream bandwidth is approximately 1 megabit per second. The CCM also provides a robust error detection and correction process.

The CCM is frequency configurable for both upstream and downstream channels. Upon installation of the system, the cable transport network is analyzed to locate the least noisy portion of the available spectrum. The set top terminals are then set to transmit and receive on the selected frequencies having the least noise. The CCMs are configured to use the frequencies programmatically from the SCM. The SCM interfaces to the CCMs through a SCM shelf backplane using a shared memory mailbox approach within the VME bus architecture. A simple reliable link protocol is applied in both directions resulting in guaranteed delivery of data packages.

Since there is only one CCM that transmits per path in the downstream direction, and the upstream and downstream paths are independent, downstream signal collision cannot occur. Therefore, the CCM may transmit whenever it has data to send. Similarly, every set top terminal simply transmits whenever it has data to send. No carrier sense or collision detection need be performed. When the CCM receives a message, it transmits an acknowledgment to the sending set top terminal. If the transmitting set top terminal does not receive an acknowledgment within the time it takes the packet to be transmitted, processed and acknowledged, the set top terminal assumes that the message was interrupted and not received. In that case, the set top terminal performs a random backoff and then retransmits the message. A sequence number per set top terminal is employed to prevent duplicate messages from being passed up to higher layers of the SCM software. Since collision detection is not performed, there is no relationship between the minimum packet size and the maximum distance between two nodes in the network.

A low frequency "keep alive" poll, on the order of every five minutes, is required by the set top terminals that have been powered off so that streams allocated on those DVMs can be released for use by other subscribers. The polling frequency determines the worst case length of time between a subscriber removing power and the SCM reallocating the stream and ceasing the subscriber billing function.

The command traffic from individual set top terminals is likely to be bursty. Subscribers enter command information to the set top terminal, interact for one or two minutes with the terminal, and then watch a movie for an extended period of time. The set top terminal is designed to wait for an acknowledgment long enough for the message to propagate upstream, be processed, and for an acknowledgment to propagate downstream. The set top terminal should wait for approximately 80 micro-seconds before performing the backoff and message retransmission after not receiving an acknowledgment. Illustratively, the backoff (a wait period) starts off small enough to resolve a transmission collision between messages from two set top terminals and increases exponentially to resolve a collision between sixty-four or more set-top terminals. If two set-top terminal transmissions collide, ideally, one should retransmit immediately and the other should retransmit after at least the worst case transmission delay, approximately 3 milliseconds. The backoff time is a multiple of the worst case transmission delay selected as a random number less than the maximum transmission delay, which doubles upon each successive collision.

The downstream command channel does not have collisions, but it is still subject to lost packets due to the network noise. Therefore, the set top terminal returns an acknowledgment whenever it receives a message from the CCM. If the acknowledgment is not received in the time it takes for the message to be transmitted, received, processed and an acknowledgment queued and transmitted, the message will be resent. Note, since there can be no collisions, a backoff period is not required.

Figure 4:
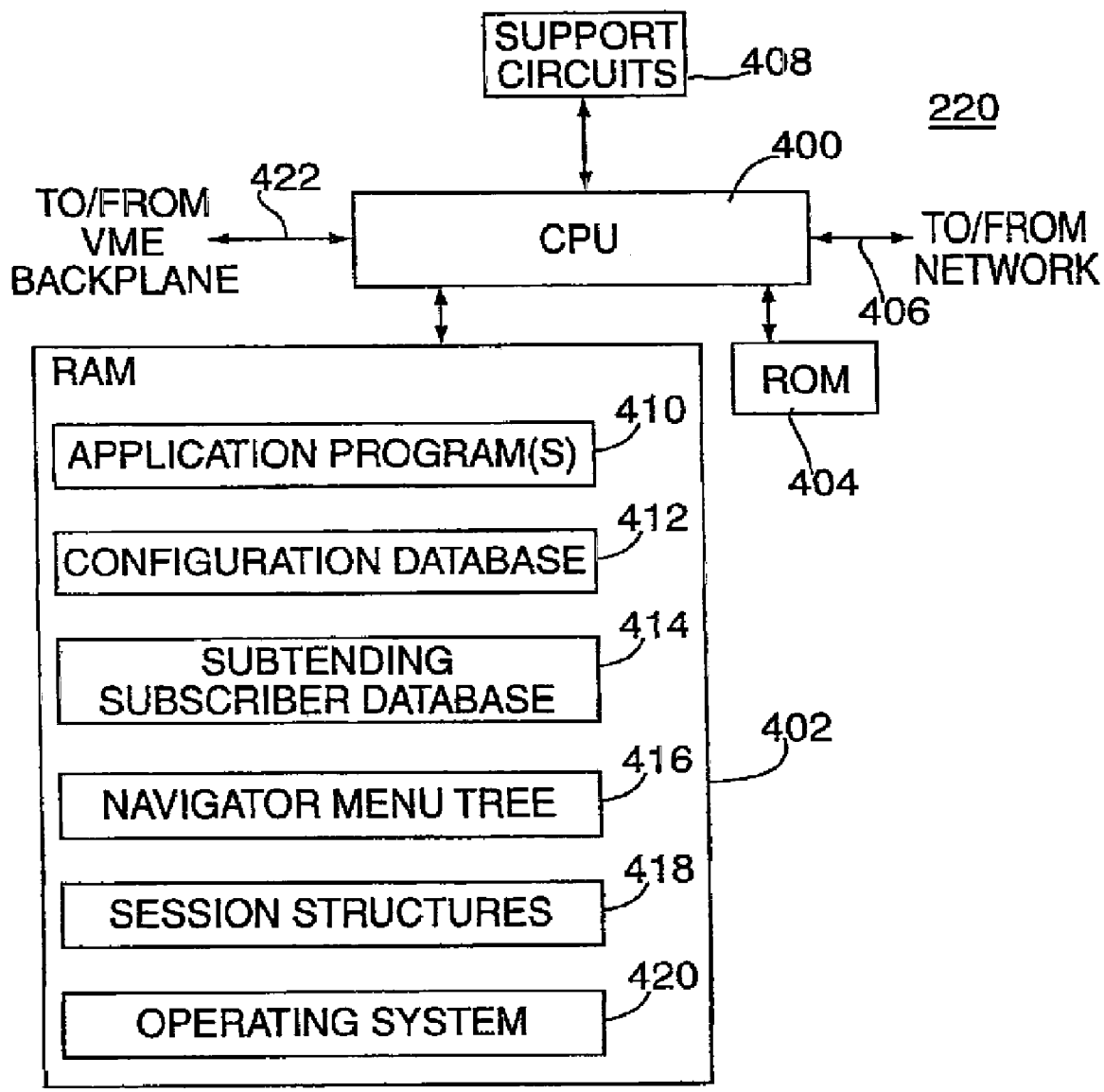
FIG. 4 depicts a block diagram of the video session manager computer.

FIG. 4 depicts a block diagram of the SCM hardware 220. This hardware contains a central processing unit (CPU) 400, random access memory (RAM) 402, read only memory (ROM) 404, an RS-482 interface 406, a VME backplane interface 422 and CPU support circuits 408 such as clock, cache, power supplies and the like. The RAM 402 contains an application program(s) 410, a configuration database 412, a subscriber database 414, a "navigator" menu tree 416, session structures 418, and operating system entities 420. All programming for the SCM is conducted using object oriented programs.

The subscriber database 414 provides information on a per subscriber basis. The database may or may not be downloaded as part of the configuration database 412. The subscriber database includes information regarding each set top terminal including one or more personal identification numbers (PINs), a terminal identification number (TID), present terminal state, and the like. Subscribers may modify their PINs using their set top terminals; therefore, subscriber objects such as PINs are capable of being written back to the database. A disclosure of an illustrative PIN management method and apparatus is disclosed in commonly assigned U.S. patent application Ser. No. 08/738,343 filed Oct. 25, 1996 and herein incorporated by reference.

The session database 418 is constructed by the SCM at run time. The SCM manages the sessions dynamically as they are created and destroyed. This database contains a different database structure for different session types. For example, a barker session that is initiated when a viewer tunes to a barker channel, is associated with a database containing the set top terminal ID that has been tuned to the barker and the state of the terminal. The state of the terminal describes the type of programming being processed by the terminal, i.e., analog mode, barker viewing (broadcast mode), navigator viewing, program viewing and the like. Also, a movie session produces a session database that contains the TID of the terminal viewing the movie, the terminal state, a PD), an expiration timer value indicating when the movie is expected to be complete, a use timer value indicating the duration of the session, the subscriber ID (e.g., PIN) and the like. Furthermore, for a navigator session, i.e., a session in which the subscriber is browsing the available information selections, the session database 418 contains a TID and its state as well as historical information regarding the browsing function.

The configuration database 412 describes how the hardware is configured, e.g., which DVMs are active or standby, available frequencies, terminal configuration information, DVM information and the like. The database is either downloaded or recovered from local non-volatile storage.

The navigator menu tree 416 is downloaded from the file server when the SCM boots. The tree consists of a set of variable length nodes and an index which provides the offset of a node given its identification number. The tree describes the particular pattern of navigator movements available to a subscriber and what programming is available to a particular subscriber as defined by that subscriber's PIN. For example, a subscriber having entered a PIN that provides "regular" viewing authorization would be able to use "navigator buttons" that facilitate browsing and preview of all non-adult material. As such, the menu tree structure utilized by this subscriber would not include branches to adult material. In contrast, a subscriber that enters a PIN which authorizes access to so-called "late night" programming utilizes a different tree structure than that used in regular viewing. The "late night" programming tree structure includes access to buttons that permit viewing of adult material. As such, each tree is activated on a subscriber-by-subscriber basis and defines the manner in which the navigator is executed for each subscriber. A detailed description of the navigator appears in commonly assigned U.S. provisional patent application Ser. No. 60/034,490 filed Jan. 13, 1997 and incorporated herein by reference.

The ROM 404 contains software that is capable of performing "power on self test" and booting a software image from a network. The ROM 404 is approximately 256 kilobytes. The non-volatile memory is programmed during manufacturing to store a network address, serial number, date of manufacture, and component revision levels. There is no requirement to save any other configuration information across a system boot.

The RS-482 interface has at least six ports with one port connected to the RS-482 network bus, one for the SCM and four for the DVM interface modules. The SCM CPU 400 is a 68K family microprocessor available from Motorola. Preferably, the microprocessor within CPU 400 is the 68040 enhanced 32-bit microprocessor having 8 kilobytes of cache, MMU and FPU, and running at a clock speed of approximately 25 to 33 MHz. Such a microprocessor including a VME bus interface, on-board RAM, a SCSI interface, non-volatile memory, communication ports, various clocks and timers, an RS-482 transceiver interface, and ROM is available on a single CPU circuit card as a model number MVME167 from Motorola. The card is installed in an NEBS compliant chassis. Alternatively, the MVME162 model circuit card also available from Motorola can be used. Either of these cards are plugged into a 20 slot VME backplane available from Motorola as part number MC1120.

A number of operating systems 420 are available for use by the hardware including the pSOS+ available from Integrated Systems, Inc., the Vx Works available from Wind River Systems, VRTX available from Microtec Research, Inc., QNX available from QNX Software Systems, Ltd., and OS/9 available from Microware.

As mentioned above, the SCM also maintains system synchronization from end-to-end, e.g., from server to set top terminal. The server has a high accuracy, level 1 clock that is provided to the stream distributor 200 in FIG. 2. Each of the clocks in the video session manager 106 are derived from this clock signal. The DVM clocks are used to retrieve data from stream distributor 200 and clock the data from the distributor as packets for modulation. Thus, all data is synchronized to the synchronization clock. The output bit rate is 8 times the MPEG-2 stream rate of 3.37125 Mbps. This is directly proportional to 29.97 frames per second of conventional video signals. Thus, the system clock is built into the bit stream. The same clock signal is used as the basis for modulating all data streams. As such, the same clock signal is sent to every set top terminal. The clock is extracted by the set top terminal (e.g., frequency and phase locked) to provide end-to-end system synchronization. Because of this end-to-end synchronization, conventional MPEG-2 transport circuitry is not needed to remove jitter by buffering the data. Thus, the set top terminal is less complicated and less expensive. Additionally, a fully synchronized system permits switching from stream-to-stream without the need for resynchronization.

The system provides fixed multiplexing rates, i.e., 8 subrate server channels of 3.37125 Mbps, or less than 8 super rate channels, e.g., multiples of the 3.37125 Mbps. For special transmissions that require superior bandwidth, a program can be sent using a plurality of channels. For example, the bandwidth required to adequately present a basketball or football program is probably greater than the bandwidth required to adequately present a black and white movie.

The system is capable of dynamically allocating information channel resources to the subscribers. Allocation decisions are predicated on subscriber program requests and subscriber resource usage. For example, programs may be characterized according to program content during, e.g., a storage or pre-transmission operation. Such a characterization provides an indication of a necessary, desirable or optimal information channel resource level (i.e., bandwidth). A subscriber requesting a program requiring a high information channel resource level (e.g., a basketball game) will be allocated an additional subrate channel or a super rate channel (if available). A subscriber requesting a program requiring a low information channel resource level (e.g., a black and white movie) will be allocated fewer (or only one) subrate channels. If a subscriber having been allocated one or more subrate channels or a super rate channel terminates a session, the bandwidth released by the terminating subscriber may be re-allocated among the remaining active subscribers. Ideally, all subscribers receive programs with an optimal information channel resource level. The system monitors various loading parameters and makes resource allocation decisions in accordance with this ideal. When a session ends, the video session manager terminates the session and clears that particular session database. If pause is selected, after a delay (e.g., 2 minutes) the session is ended.

D. The Cable Transport Network 110

The cable transport network 110 of FIG. 1 is a conventional hybrid fiber-coax cable television (CATV) system having forward information channel (in-band upstream information channel) operating a 50 to 750 megahertz. This channel carries the broadband information to the subscriber set top terminal. The network also carries the forward command control channel (out-of-bandupstream channel) operating at 50-750 MHz and a reverse or back channel (out-of-band downstream channel) operating at 5-42 MHz. The cable transport network further contains conventional receiver/bridger amplifiers and line amplifiers to insure that a high-quality signal is received by each of the set top terminals connected to the network. As such, the network is capable of supporting three uni-directional channels.

Although the cable transport network is illustratively described as a hybrid fiber-coax network, other network forms may be used such as all fiber, all coax, or any other broadband communications network that will support three unidirectional communications paths.

E. Set Top Terminal 118

The set top terminal 118 of FIG. 1 receives the QAM modulated signal from the cable transport network and demodulates the signal. The set top terminal demodulates and depacketizes the in-band QAM signal as well as demodulates the upstream control signals and modulates the downstream control signals. Although the term "set top terminal" is referred to herein as the transceiver portion of the subscriber equipment that performs its functions separate from the other portions of the subscriber equipment, it should be understood that the set top terminal functionality can be integrated into the subscriber equipment to form a single consumer electronics product, e.g., a television having a built in transceiver of the present invention.

Figure 5:
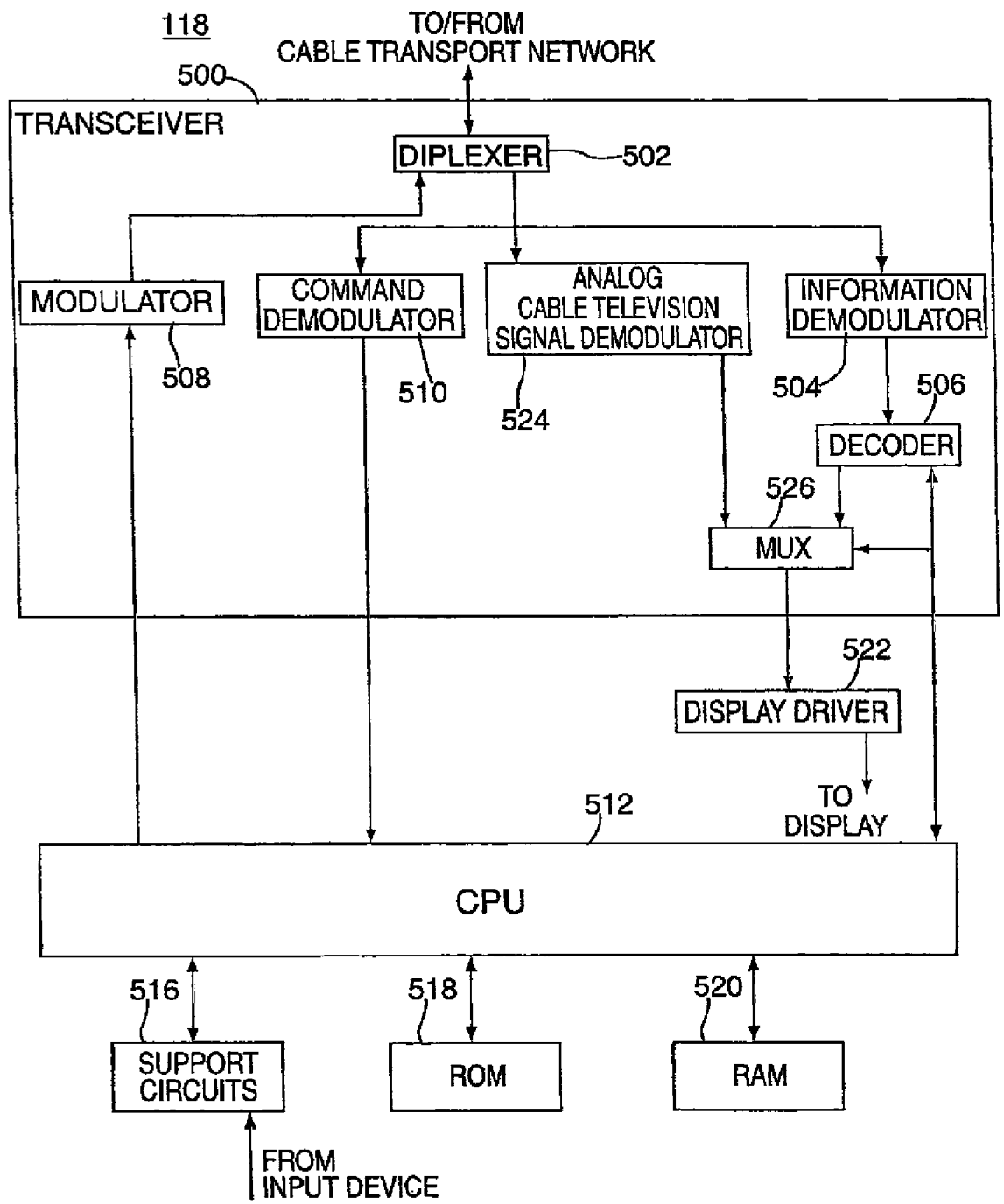
FIG. 5 depicts a detailed block diagram of a set top terminal.

In particular, FIG. 5 depicts a block diagram of the set top terminal 118 which contains a transceiver 500 a central processing unit (CPU) 512 and a display driver 522. The CPU 512 is supported by RAM 520, ROM 518 and various support circuits 516 such as clocks, power supply, an infrared receiver and the like. The transceiver 500 contains a diplexer 502, a back channel modulator 508, an information channel demodulator 504, a command channel demodulator 510, an information decoder 506, a conventional television signal demodulator 524, and a multiplexer 526. The diplexer 502 couples the three channels carried by a single cable within the network to the modulator and demodulators. Each demodulator 504 and 510 tunes and downconverts the signals from the cable network in a conventional manner. The information channel demodulator 504 is a conventional QAM demodulator such as a model BCM3115 manufactured by Broadcom. Other such demodulators are well-known in the communications arts. However, this particular QAM demodulator also contains a built in "out-of-band" QPSK demodulator for handling command channel data carried by the forward command channel. As such, a single integrated circuit can process both subscriber requested information (audio and video) as well as command data.

The decoder 506 processes the data packets carrying subscriber requested information produced by the QAM demodulator into useable signals for the end user display, e.g., television, home studio, video recorder and the like. The data for display is conventionally processed by a display driver 522 to produce composite video as well as a conventional television signal.

The conventional cable television signal demodulator 524 contains a tuner and analog (NTSC) demodulator. A multiplexer 526 couples the demodulated analog or decoded video signal to the display drive 522.

The demodulated QPSK signal provides command and control information to the CPU 512 for generating certain graphics and control interface regions upon a television screen. The CPU is, for example, a Model 68302 processor manufactured by Motorola. This processor, operating in combination with the decoder 506, produces screen displayed "buttons" or regions with which a subscriber interacts using an infrared remote control 120.

Specifically, a joystick on the remote control highlights selectable regions or icons on the television screen. When a particular icon is highlighted, the subscriber depresses a "select" key on the remote that sends an infrared signal to an infrared receiver (a support circuit 516). This receiver sends the command to the CPU for interpretation. If the command is a request for a local function to be implemented, e.g., volume control, the CPU performs the function locally. However, all non-local functions that involve requesting information or manipulating the presentation of the information are communicated to the service provider. As such, the processor formats the command and sends it to the back channel modulator for transmission to the video session manager.

The available non-local session control commands are infinitely variable including, but not limited to, information select, play, stop, rewind, forward, pause, and the like. The control commands are sent via a BPSK modulator 508 and an imbedded transmitter through the back channel to the CCM. The CCM demodulates and couples the command to the SCM which implements the command. The operation of the navigator which facilitates finding, communicating, and controlling the information is disclosed in commonly assigned U.S. provisional patent application 60/034,490 filed Jan. 13, 1997.

Although various embodiments which incorporate the teachings at the present invention have been shown and described in detail herein, those skilled in the art can readily devise many other varied embodiments that still incorporate these teachings.

The invention claimed is:

1. A method comprising:
receiving, from a terminal via a back channel, a request for at least one program of a plurality of programs, said request having a personal identification number (PIN) associated with a requesting viewer and a unique terminal identification number (TID) assigned to the terminal;
comparing the received TID from the request to a stored TID at a service provider to confirm the received TID;
comparing the received PIN from the request to a stored PIN at said service provider to confirm the received PIN;
sending, in response to confirming the received TID and the received PIN in the steps of comparing, the requested at least one program via a forward channel, said requested at least one program comprising data stream packets containing the received TID;
assigning, periodically by the service provider, a randomly altered TID to said terminal;
associating each of the requested at least one program with a unique program identification number (PID); and
randomly assigning and altering each PID.

2. The method of claim 1, further comprising:
sending, from the service provider, each PID to a server storing said plurality of programs; and
receiving, at the service provider, the requested at least one program from the server upon completion of said comparing steps.

3. The method of claim 1, further comprising:
maintaining a database particular to the requesting viewer;
associating the PIN of the requesting viewer with at least one authorized menu tree;
providing said at least one authorized menu tree to the requesting viewer for browsing and selection.

4. The method of claim 1, further comprising randomly assigning and altering the PIN.

5. An apparatus comprising:
a processor; and
memory storing at least one application program that, when executed by the processor, causes the apparatus to:
receive, from a terminal via a back channel, a request for at least one program of a plurality of programs, said request having a personal identification number (PIN) associated with a requesting viewer and a unique terminal identification number (TID) assigned to the terminal;
compare the received TID from the request to a TID stored at the apparatus to confirm the received TID;
compare the received PIN from the request to a PIN stored at the apparatus to confirm the received PIN;
send, in response to confirming the received TID and the received PIN in the steps of comparing, the requested at least one program via a forward channel, said requested at least one program comprising data stream packets containing the received TID;
periodically assign a randomly altered TID to said terminal;
associate each of the requested at least one program with a unique program identification number (PID); and
randomly assign and alter each PID.

6. The apparatus of claim 5, wherein the at least one application program, when executed by the processor, causes the apparatus to:
send each PID to a server storing said plurality of programs; and
receive the requested at least one program from the server upon completion of said comparing steps.

7. The apparatus of claim 5, wherein the at least one application program, when executed by the processor, causes the apparatus to:
maintain a database particular to the requesting viewer;
associate the PIN of the requesting viewer with at least one authorized menu tree;
provide said at least one authorized menu tree to the requesting viewer for browsing and selection.

8. The apparatus of claim 5, wherein the at least one application program, when executed by the processor, causes the apparatus to:
randomly assign and alter the PIN.

9. The apparatus of claim 5, wherein the at least one application program, when executed by the processor, causes the apparatus to:
receive, from a server storing said plurality of programs, a reference clock signal;
modulate a plurality of data streams comprising at least two of the plurality of programs based on the received reference clock signal; and
transmit the plurality of modulated data streams to the terminal.

10. The apparatus of claim 9, further comprising:
an oscillator source phase-locked to the reference clock signal.

11. The apparatus of claim 5, further comprising:
a first modulator configured to send the requested at least one program at a first modulation frequency via the forward channel at a first instance of time; and
a second modulator configured to send the requested at least one program at a second modulation frequency different from the first modulation frequency via the forward channel at a second instance of time different from the first instance of time,
wherein the at least one application program, when executed by the processor, causes the apparatus to:
instruct the terminal to decode from the second modulator during the second instance of time.

12. The apparatus of claim 5, wherein the at least one application program, when executed by the processor, causes the apparatus to:
allocate at least one channel to the terminal based on a load associated with the terminal relative to a load associated with at least one other terminal.

13. The apparatus of claim 5, wherein the at least one application program, when executed by the processor, causes the apparatus to:
open a session for the terminal responsive to receiving the request for the at least one program.

14. The apparatus of claim 13, wherein the at least one application program, when executed by the processor, causes the apparatus to:
- receive an input indicating that a pause was selected by the viewer;
- determine that the selection of the pause exceeds a threshold amount of time; and
- terminate the session responsive to determining that the selection of the pause exceeds the threshold amount of time.

15. The apparatus of claim 5, wherein each of the data stream packets is of a fixed length.

16. The apparatus of claim 5, further comprising:
- at least one control channel modem configured to send the requested at least one program via the forward channel to the terminal using a broadcast mode.

17. The apparatus of claim 5, further comprising:
- at least one control channel modem configured to send the requested at least one program via the forward channel to the terminal using a narrowcast mode.

18. The apparatus of claim 5, further comprising:
- at least one control channel modem configured to send the requested at least one program via the forward channel to the terminal using a pointcast mode.

19. The apparatus of claim 5, further comprising:
- a packetizer configured to generate the data stream packets.

20. The apparatus of claim 5, wherein the at least one application program, when executed by the processor, causes the apparatus to:
- receive the data stream packets from a server.

* * * * *

UNITED STATES PATENT AND TRADEMARK OFFICE
CERTIFICATE OF CORRECTION

PATENT NO. : 7,865,926 B2  Page 1 of 1
APPLICATION NO. : 12/637375
DATED : January 4, 2011
INVENTOR(S) : Donald Gordon et al.

It is certified that error appears in the above-identified patent and that said Letters Patent is hereby corrected as shown below:

Column 8, Line 12:
Please delete "mutes" and insert --routes--.

Signed and Sealed this
Twentieth Day of September, 2011

David J. Kappos
*Director of the United States Patent and Trademark Office*